March 28, 1950 C. L. BRADFORD 2,501,840

MAP HOLDER

Filed Feb. 28, 1947

INVENTOR.
Carlos L. Bradford.
BY
Corbett, Mahony & Miller
ATTORNEYS

Patented Mar. 28, 1950

2,501,840

UNITED STATES PATENT OFFICE 2,501,840

MAP HOLDER

Carlos L. Bradford, Coshocton, Ohio

Application February 28, 1947, Serial No. 731,430

8 Claims. (Cl. 40—86)

My invention relates to a map holder. It has to do, more particularly, to a device for holding a map or chart in such a manner that reference may be conveniently made to any desired section thereof.

Various devices have been provided in the past for holding maps or charts. These devices have included rollers or spools for supporting the map, the map being unwound from one to the other so as to move the desired sections past a viewing opening or slot in the casing of the map holder. One of the disadvantages of such a prior art device has been that it is difficult to remove and replace the rolls with different maps. Another disadvantage has resided in the fact that proper illumination has not been provided for the map.

One of the objects of my invention is to provide a map holder which includes a casing having a pair of rollers or spools rotatably mounted therein, the map being adapted to be unwound from one spool to the other past a viewing window or slot, the spools being so carried by the casing that they can be removed and replaced easily.

Another object of my invention is to provide a map holder of the type indicated wherein the spools are so mounted that they may be locked easily in any position to which they are rotated so that the desired map section will not be moved accidentally out of range of the viewing opening.

Another object of my invention is to provide a map holder wherein a movable light is provided directly behind the viewing opening and can be moved with ease to any desired position longitudinally of the exposed map section so that pin point lighting of any selected point of the map will result.

Another object of my invention is to provide a map holder which is very simple, inexpensive and compact.

Various other objects will be apparent.

The preferred embodiment of my invention is illustrated in the accompanying drawing wherein like characters of reference designate corresponding parts and wherein.

Figure 1:
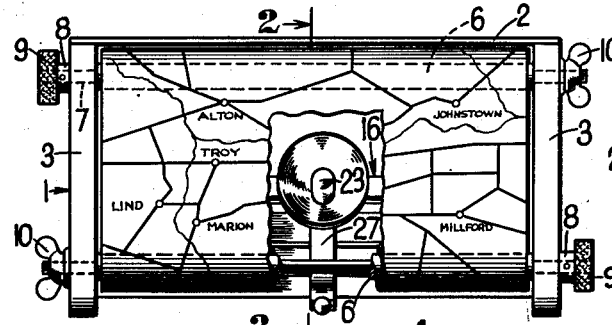
Figure 1 is a front elevational view, partly broken away, of a map holder made according to my invention and having a map mounted therein.

With reference to the drawing, I have illustrated my map holder as comprising a casing 1 which may be formed of metal or plastic or any other suitable material. The casing 1 includes a rear wall member 2 of arcuate cross-section. This member 2 is secured at its ends to comparatively heavy end wall members 3. These members 3 have rear edges of arcuate form, corresponding to the curved cross-section of wall 2. Each member 3 is provided with a substantially vertical forward edge 4 and a straight lower horizontally disposed edge 5. It will be noted that the front side of the casing and also the bottom are open. The open front side, as will later appear, provides a viewing opening or slot completely across the holder for viewing the map to be mounted therein.

Figure 2:
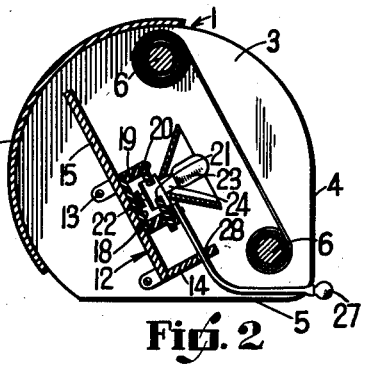
Figure 2 is a transverse sectional view taken substantially on line 2—2 of Figure 1.

Rotatably mounted in the end walls 3 is a pair of rolls, spools or spindles 6. One of these spindles, as shown best in Figure 2, is supported just below the upper forward edge of the curved wall 2. The other spindle is supported at the forward and lower corners of the walls 3. Each spindle is provided with reduced ends 7 which fit rotatably on openings in members 3. Forming the reduced ends produces the shoulders 8. One end of each spindle 6 has a knurled knob 9 keyed thereon. The other end is threaded and receives a wing nut 10. The knob 9 is preferably set a distance from the adjacent shoulder 8 which is thicker than the wall member 3 so as to permit limited axial movement of spindle 6. By tightening the wing nut 10 at the opposite end, the spindle 6 may be clamped to the wall member 3 at that end, by shoulder 8 and nut 10, and this will prevent further rotation of the spindle. Both of the spindles are mounted in the identical manner except that the knob 9 of one is provided at the end opposite to the location of the knob 9 of the other. This will facilitate rotation of the spindles.

Maps can be supplied for mounting in this device in the form of a roll carried by a spindle. This spindle can be mounted easily in the holder and then the end of the map can be connected to the other spindle by an attaching tab formed on the end of the map and cooperating with a slot 11 in the spindle which extends longitudinally thereof. It will be apparent that when the spindles are unlocked, the map may be unwound from one spindle onto the other thereby moving the map relative to the front open side of the holder. The map may be locked in position after the desired section thereof is exposed. It is preferred that the sections of the map be so arranged that the main route indications, if it is a road map, extend from one end of the casing to the other.

Figure 3:
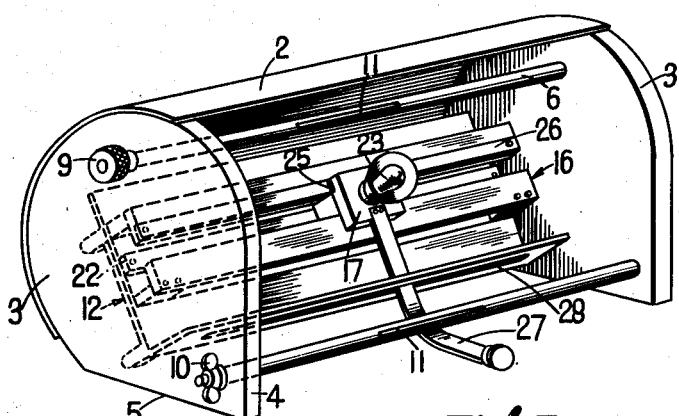
Figure 3 is a perspective view of the map holder with the map removed therefrom.
Figure 4:
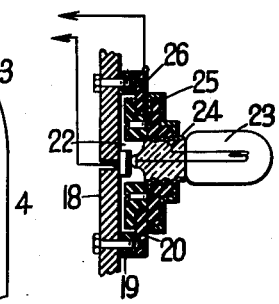
Figure 4 is a transverse sectional view taken through the supporting guide for the movable light.

For pin point lighting any point transversely of the casing or longitudinally of the map section, I provide the illuminating arrangement which will now be described. This arrangement includes a substantially V-shaped trough or reflector 12 which extends from end wall 3 to end wall 3 and is suitably secured thereto, for example, by clips and screws 13. The lower wall 14 of this trough will extend forwardly and upwardly. The rear wall 15 extends rearwardly and upwardly almost to the rear wall 2. Mounted on this rear wall at a point substantially midway between the locations of the two spindles 6 is a bulb support guideway structure 16 upon which a bulb support 17 is mounted for longitudinal movement. The guideway 16 includes a longitudinally extending base strip 18, secured to wall 15, side strips 19 and inwardly extending guide strips 20, all being formed of electrical insulating material. The strips 20 extend towards each other and provide a guide or slot therebetween which receives a guide portion on the member 17. This member 17 is also formed mainly of insulating material and has guide channels 21 in its opposite edges which cooperate with the strips 20. A contact strip 22 is provided along the bottom member 18 and will be engaged by the contact point of the bulb 23. This bulb 23 will be threaded into a metal socket member 24 which is provided with a contact extension 25 that engages a contact strip 26 carried on one of the members 20. Thus, the contact strips 22 and 26, which extend the full length of the guide 16, provide a circuit for the bulb 23 regardless of the position to which it is moved along the guide 16. For moving the bulb to any desired position along the guide 16, I provide a handle 27 which is attached to the insulated part of member 17. This handle extends downwardly through a slot 28 that extends longitudinally of wall 14 and then extends forwardly a substantial distance beyond the position of the lower spindles 6, as shown best in Figures 2 and 3.

Figure 5:
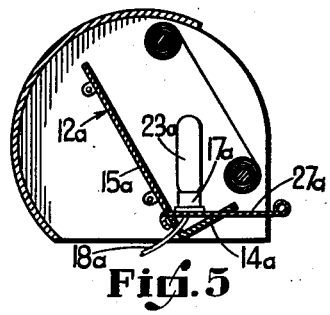
Figure 5 is a transverse sectional view taken through a modified form of my map holder.

In Figure 5, I illustrate a structure which is substantially like that previously described with the exception that the bulb 23a is carried by a supporting member 17a which, in turn, is carried directly by the trough or reflector 12a. The member 17a includes a horizontally disposed handle member 27a which extends through aligning slots in the walls 14a and 15a of member 12a. Electric wires 18a lead directly to the bulb socket and pass through a longitudinal slot formed in the rear wall 15a. With this arrangement, the bulb 23a may be moved to different positions along the reflector 12a.

It will be apparent that with the structure described above the map can be supported for convenient use. The map-carrying spindles may be removed and replaced with ease. The spindles may be rotated to expose the proper section of the map and then can be locked into position. The light may be moved to any position between the end walls of the casing and beneath the exposed section of the map. This will provide for pin point lighting of any selected point. Furthermore, the reflector 12 or 12a will reflect light beneath the entire exposed section of the map, softly illuminating such entire section.

Figure 6:
Figure 6 is a perspective view illustrating how the map holder may be used in an automobile in a convenient location for the driver.

In Figure 6, I illustrate how the map holder may be conveniently supported on the dash of an automobile in a position readily visible and readily acceptable to the driver.

Having thus described my invention, what I claim is:

1. A map holder comprising a supporting structure, spindles mounted on said structure in axially spaced relationship, the map being supported by said spindles and adapted to unwind from one and wind on the other, means for illuminating the section of the map between such spindles, said means comprising a guide located between such spindles and substantially parallel to the axes thereof, a light holder mounted on said guide and movable along said guide, and a handle on said holder which extends towards and beyond one of said spindles.

2. A map holder comprising a supporting structure including an arcuate rear wall attached to a pair of end walls, the bottom and forward sides of said structure being open, a spindle rotatably mounted in said end walls directly adjacent the forward edge of said rear wall, a spindle rotatably mounted in said end walls adjacent the forwardmost and lowermost points thereof, the map being adapted to unwind from one of said spindles onto the other, means for illuminating the section of the map between said spindles which will be visible from the forward side of the spindle, said means comprising a guide extending from end wall to end wall, said guide being disposed between said spindles and being axially spaced therefrom and substantially parallel thereto, a light holder supported on said guide for movement therealong, and a handle member attached to said light holder and extending forwardly beneath and beyond the lowermost holder.

3. A map holder according to claim 2 wherein a reflector is provided behind and beneath said guide and extends from end wall to end wall.

4. A map holder according to claim 3 wherein the reflector is of substantially V cross-section, the rear wall being of greater depth and extending to a point close to said arcuate rear wall.

5. A map holder according to claim 2 including a reflector extending from end wall to end wall supporting said guide, said reflector having electric contact strips extending the full length thereof, said light holder being provided with contact members for slidably engaging said contact strips.

6. A map holder according to claim 2 wherein means is provided for clamping said spindles to the end walls to prevent rotation thereof.

7. A map holder according to claim 1 wherein the light holder has a reflector carried thereby for directing the light towards the map section.

8. A map holder according to claim 1 wherein the guide is disposed in a plane behind the plane of the axes of said spindles intermediate such spindles, and wherein the light holder is provided with a reflector for directing the light forwardly towards the map section.

CARLOS L. BRADFORD.

REFERENCES CITED

The following references are of record in the file of this patent:

UNITED STATES PATENTS

| Number | Name | Date |
| --- | --- | --- |
| 1,692,633 | Dicomes | Nov. 20, 1928 |
| 2,209,990 | McCauley | Aug. 6, 1940 |

FOREIGN PATENTS

| Number | Country | Date |
| --- | --- | --- |
| 462,770 | Germany | July 17, 1928 |

Certificate of Correction

March 28, 1950

Patent No. 2,501,840

CARLOS L. BRADFORD

It is hereby certified that errors appear in the printed specification of the above numbered patent requiring correction as follows:

Column 4, line 24, for the word "spindle" read *holder*; line 31, for "holder" read *spindle*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*